June 13, 1944.  E. REICHERT  2,351,287
SUN GLASS ATTACHMENT FOR EYE GLASSES
Filed Dec. 31, 1941
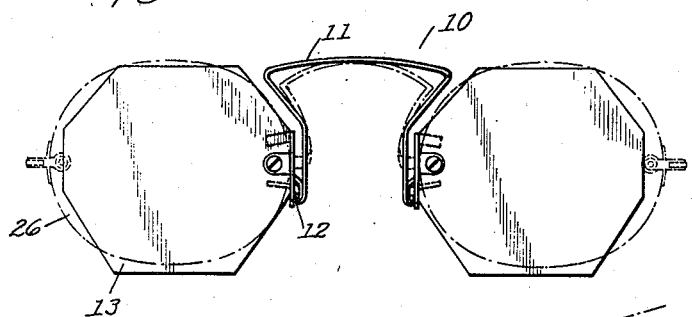
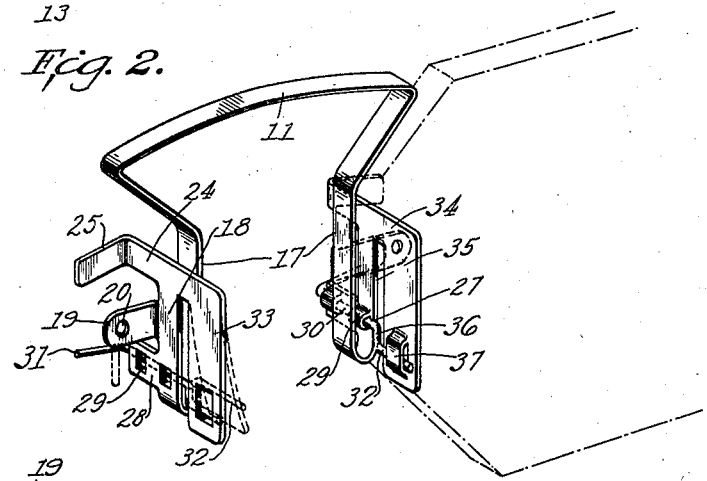
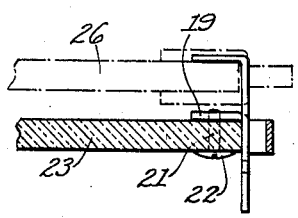
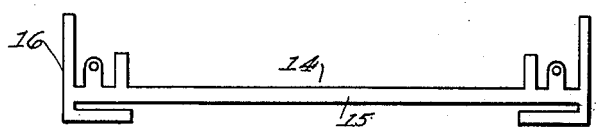
Inventor
Ellsworth Reichert Patented June 13, 1944

2,351,287

UNITED STATES PATENT OFFICE 2,351,287

SUNGLASS ATTACHMENT FOR EYEGLASSES

Ellsworth Reichert, Baldwin, Md.

Application December 31, 1941, Serial No. 425,195

10 Claims. (Cl. 88—41)

The present invention relates to improvements in eye glasses, and refers particularly to a cover or sun glass attachment for eye glasses.

An object of the invention is to provide cover glasses in which the lenses are connected together by a mounting having means for permitting the glasses to be easily and quickly attached to a pair of regular or permanent eye glasses.

In sun or cover glass constructions as previously manufactured, the hooks or other eye glass engaging elements are rigid and stationary with respect to the lens mounting or frame. For this reason, it has been found, particularly with the present type of eye glass frame, that it is difficult to attach and detach the cover glasses to the permanent eye glasses. This is due primarily to the fact that the lower hook elements extend laterally from their mountings and form obstructions which do not readily clear the lenses of the permanent eye glasses. The present invention eliminates these objectionable features by the provision of means for retracting the lower hook elements out of their normal operative positions when the cover glasses are attached to and removed from the permanent glasses.

A further object of the invention is to form the greater portion of the mounting or frame of the cover glasses from stamped metal, whereby most of the elements of the frame form an integral one-piece structure which may be manufactured in quantity production at low cost.

With the foregoing and other objects in view, the invention will now be more particularly described, reference being had to the accompanying drawing, in which:

Figure 1 is a front elevation of my sun or cover glasses applied to a pair of permanent glasses.

Figure 2 is an enlarged view of the frame, including the bow spring and lens mountings.

Figure 3 is a fragmentary horizontal section showing a cover glass attached to a permanent eye glass, and Figure 4 is a detail of the lens mounting and bow spring as they appear when first blanked out from a sheet of spring metal.

Referring now to the drawing, the numeral 10 designates generally my sun or cover glass attachment for permanent eye glasses and comprises a bow spring 11, lens mountings 12 connected to opposite sides of the bow spring and lenses 13 carried by the lens mountings. While the frame comprising the bow spring and lens mountings may be formed of any desired material, I prefer to stamp this frame out of spring metal whereby the majority of the frame elements comprise a unitary and integral construction.

Referring to Figure 4, the frame 14 is shown as originally stamped out, comprising the intermediate bow spring strip 15 and end portions 16, each of which comprises the lens mounting and permanent glass attaching elements.

The frame 14, after being stamped out, is then bent to its final form as disclosed in Figures 1 and 2. Referring particularly to Figure 2, it will be observed that the bow spring 11 is provided with spaced depending legs 17. Each leg at its lower end is return bent upon itself to form a central bar 18 which comprises the main lens support. Projecting outwardly intermediate the ends of the bar 18 is a lens clamping strap 19 provided with a threaded opening 20 for receiving a screw 21 (see Figures 1 and 3). This screw is provided with a relatively large head 22 which takes the place of a second clamping strap and cooperates with the strap 19 to securely clamp and retain the lens 23 on the frame. It will be observed that the inner flat surface of the lens abuts the bar 18.

At the upper end of each bar 18 is formed an integral cross arm 24 having its free end bent or curved to form a hook 25. This hook cooperates with a spaced lower hook (to be hereinafter described) to form a permanent glass engaging member which, as shown in Figures 1 and 3, is adapted to embrace the inner portion of the lens 26 of a pair of permanent glasses and detachably support the sun or cover glasses on the permanent glasses. In the past, it has been the custom to form both the upper and lower hooks as rigid portions of the frame and while the bow spring is sufficiently resilient to permit movement of the legs 17 toward each other, it has been found that difficulty is encountered in attaching and removing the cover glasses from the permanent glasses. This is due primarily to the fact that the hooked portions fail to clear the edges of the lenses of the permanent glasses and in many instances either the cover glasses, permanent glasses or both are injured in attaching or removing the cover glasses. I have found that if the lower hooked portion is moved out of its operative permanent glass engaging position, that is, from a horizontal to a vertical position, the cover glasses can be easily and quickly slipped over the top of the permanent glasses and moved down so that each top hook 25 will engage its respective lens 26; thereafter the lower hook members can be moved back to their normal permanent glass engaging positions.

Referring particularly to Figure 2, I accomplish this by providing a lower permanent glass engaging member or hook 27 for each lens mounting. Each bar 18 is provided with a lower laterally extending arm 28 constituting a support for the lower hook 27. Either during the stamping operation or subsequently, this arm and the lower portion of bar 28 are provided with a pair of struck-out portions forming straps 29. These straps constitute bearings for pivotally supporting the intermediate portion 30 of the lower hook member. Preferably these hook members are formed of wire rods and, as shown in Figure 2, one end is curved or bent to form the actual permanent glass engaging portion 31. The other end of the rod 27 extends outwardly from the edge of the bar 18 and is fashioned to form a crank arm 32.

The means for normally maintaining the hook portion 31 in its operative full-line position consists of a spring arm 33 comprising a finger engaging element. This arm forms an integral part of the frame and is connected to the upper portion of the bar 18 by a cross piece 34. It will be observed that the arm 33 is spaced from the bar 18 to form an open slot 35. This spacing permits free movement of the lower end of the arm 33 relative to the bar 18 and allows the depending portion 36 of the crank arm to freely swing without contacting or jamming against either the rod 18 or the arm 33. The lower end of the spring arm 33 is provided with a struck-out portion forming an elongated slot 37 which receives the extreme end of the crank arm 32 and permits the same to slide in the strap when the spring arm is moved from its full-line position to its dotted-line position (see Figure 2).

It is to be understood that the construction as above described comprises a pair of identical movable hook members 27 and operating means therefor supported upon opposite sides of the legs 17 of the bow spring 11. With this construction it will be apparent that when it is desired to apply the cover glasses to a pair of permanent eye glasses, it is merely necessary to grasp the lower ends of the spring arms 33 between the thumb and forefinger. This will have the effect of moving each spring arm to the dotted-line position shown in Figure 2. This movement will operate the crank and thereby rotate the intermediate portion 30 in the bearings or straps 29 to move the hook portion 31 downwardly from its normally horizontal full-line position to the vertical position shown in dotted lines. With each lower hook portion 31 in this position the cover glasses may then be easily and quickly applied to the permanent glasses and thereafter the spring fingers 33 may be released. These fingers will then return to their full-line positions and in doing so will operate the cranks and return the hook portions 31 to their operative horizontal positions whereby each one will engage its respective lens 26 and cooperate with its upper hook to securely clamp the cover glasses to the permanent glasses.

Because of the resiliency or springiness of the frame and bow spring construction, the legs 17 may be compressed or moved toward each other to any desired extent. However, because of the fact that the lower hooks are moved out of the way, only a slight compression of the bow spring is necessary in applying or in removing the cover glasses. It is to be understood that when the cover glasses are applied to a pair of permanent glasses, the bow spring 11 is placed under slight compression or tension sufficient to securely maintain the cover glasses in operative engagement. It is to be further understood that, if desired, any means may be employed for preventing each of the rods 27 from sliding in its respective bearing and thus moving the portion 36 of the crank arm out of engagement with the slot 35; furthermore that the invention is not limited to the details of construction shown in the drawing and described in the specification, and that the phraseology employed in the specification is for the purpose of description and not of limitation.

I claim:

1. A frame for cover glasses, comprising a bow spring, a pair of lens mountings connected to opposite sides of said bow spring, a pair of permanent glass engaging members, each member including a pair of spaced hooks projecting laterally of one of the lens mountings, one hook of each pair having an intermediate portion thereof pivotally mounted on one of the lens mountings, and means carried by said frame and operatively connected to an end portion of said pivoted hook for moving the latter about its pivot relative to its adjacent hook to facilitate attachment and removal of the cover glasses from the permanent glasses.

2. A frame for cover glasses, comprising a bow spring, a pair of lens mountings connected to opposite sides of said bow spring, a pair of permanent glass engaging members, each member including a pair of spaced hooks projecting laterally of one of the lens mountings, one hook of each pair having an intermediate portion thereof pivotally mounted on one of the lens mountings, and spring means carried by said frame and connected to an end portion of said pivoted hook for moving the latter about its pivot relative to its adjacent hook to facilitate attachment and removal of the cover glasses from the permanent glasses, said spring means normally maintaining said hook in its operative permanent glass engaging position.

3. A frame for cover glasses, comprising a bow spring, a pair of lens mountings connected to opposite sides of said bow spring, a pair of permanent glass engaging members, each member including a pair of spaced upper and lower hooks projecting laterally of one of the lens mountings, the lower hook of each pair having a straight intermediate portion pivotally mounted on one of the lens mountings, said intermediate portion being extended to form a crank arm, and spring means carried by said frame and connected to said crank arm and operable to move the hook about its pivot relative to its adjacent hook to facilitate attachment and removal of the cover glasses from the permanent glasses, said spring means normally maintaining said pivoted hook in operative permanent glass engaging position.

4. A frame for cover glasses, comprising a bow spring and lens mountings formed from sheet metal, each lens mounting having a bar connected to a leg of the bow spring, a pair of spaced upper and lower arms projecting laterally from said bar, the end of the upper arm being hooked, a rod having a hooken end cooperating with the hooked arm to form permanent glass engaging means, the intermediate portion of said rod being pivotally mounted on the lower arm and being extended to form a crank arm projecting beyond the bar, and means carried by said frame and operatively connected to said crank arm to rotate said rod and move the hooked end thereof relative to the hooked arm to facilitate attachment and removal of the cover glasses from the permanent glasses.

5. A frame for cover glasses, comprising a bow spring and lens mountings formed from sheet metal, each lens mounting having a bar connected to a leg of the bow spring, a pair of spaced upper and lower arms projecting laterally from said bar, the end of the upper arm being hooked, a rod having a hooked end cooperating with the hooked arm to form permanent glass engaging means, the intermediate portion of said rod being pivotally mounted on the lower arm and being extended to form a crank arm projecting beyond the bar, a spring finger engaging arm spaced from said bar throughout the greater portion of its length and connected to said bar at its upper end, the lower end of said finger engaging arm being connected to said crank arm, whereby movement of said spring arm will rotate said rod about its pivot and move its hooked end relative to the hooked arm to facilitate attachment and removal of the cover glasses from the permanent glasses.

6. As a new article of manufacture, a frame for cover glasses stamped from sheet metal to form an elongated intermediate bow spring section and end sections constituting lens mountings, each mounting comprising a bar return bent upon and forming a continuation of a leg of the bow spring, each bar having a finger engaging portion projecting laterally from one side thereof, a permanent glass engaging element projecting from the other side of the bar, and lens clamping means carried by said bar between said finger engaging portion and said permanent glass engaging member, all of said elements forming integral portions of the stamped spring metal frame.

7. As a new article of manufacture, a frame for cover glasses stamped from sheet metal to form an elongated intermediate bow spring section and end sections constituting lens mountings, each mounting comprising a bar return bent upon and forming a continuation of a leg of the bow spring, each bar having a finger engaging portion and a permanent glass engaging element projecting from opposite sides thereof and forming therewith integral portions of the stamped metal frame.

8. As a new article of manufacture, a frame for cover glasses stamped from sheet metal to form an elongated intermediate bow spring section and end sections constituting lens mountings, each mounting comprising a bar return bent upon and forming a continuation of a leg of the bow spring, each bar having a finger engaging portion projecting laterally from one side thereof, a permanent glass engaging member comprising a pair of spaced arms projecting from the opposite side of said bar, the end of one of said arms being hooked, and lens clamping means carried by said bar between said finger engaging portion and said permanent glass engaging member, all of said elements forming integral portions of the stamped spring metal frame.

9. A frame for cover glasses, comprising a bow spring, a pair of lens mountings connected to opposite sides of said bow spring, a pair of permanent glass engaging members, each member including a pair of spaced hooks projecting laterally of one of the lens mountings, one hook of each pair being movably mounted on said frame, and finger-engaging members carried by said frame and connected to said last-mentioned hooks, said members being arranged in substantially parallel relation to each other whereby they may be grasped between the thumb and forefinger to actuate the movable hooks and thereby move the latter away from the other hooks to facilitate attachment and removal of the cover glasses from the permanent glasses.

10. A frame for cover glasses, comprising a bow spring, a pair of lens mountings connected to opposite sides of said bow spring, a pair of permanent glass engaging members, each member including a pair of spaced hooks projecting laterally of one of the lens mountings, one hook of each pair being pivotally mounted on said frame, and finger-engaging spring members, each mounted on one of the lens mountings and connected to one of said last-mentioned hooks, said members being arranged in substantially parallel relation to each other whereby they may be grasped between the thumb and forefinger to actuate the pivoted hooks and thereby move the latter away from the other hooks to facilitate attachment and removal of the cover glasses from the permanent glasses.

ELLSWORTH REICHERT.